(12) United States Patent
Kallos

(10) Patent No.: US 10,918,243 B2
(45) Date of Patent: *Feb. 16, 2021

(54) GRILL ACCESSORY

(71) Applicant: Cyclades Ventures LLC, Chicago, IL (US)

(72) Inventor: Chris P. Kallos, Chicago, IL (US)

(73) Assignee: Cyclades Ventures LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/286,756

(22) Filed: Feb. 27, 2019

(65) Prior Publication Data

US 2019/0183152 A1      Jun. 20, 2019

Related U.S. Application Data

(63) Continuation of application No. 15/453,994, filed on Mar. 9, 2017, now Pat. No. 10,238,133, which is a continuation of application No. 15/132,631, filed on Apr. 19, 2016, now Pat. No. 9,622,610.

(60) Provisional application No. 62/149,879, filed on Apr. 20, 2015.

(51) Int. Cl.
*A47J 37/07* (2006.01)
*A47J 27/04* (2006.01)
(Continued)

(52) U.S. Cl.
CPC ............. *A47J 37/0786* (2013.01); *A23L 5/13* (2016.08); *A23L 5/15* (2016.08); *A47J 27/04* (2013.01);
(Continued)

(58) Field of Classification Search
CPC ......... A23L 5/13; A23L 5/15; A23V 2002/00; A47J 27/10; A47J 33/00; A47J 36/24;
(Continued)

(56) References Cited

U.S. PATENT DOCUMENTS 205,224 A * 6/1878 White
587,528 A    8/1897 Inman
(Continued)

OTHER PUBLICATIONS https://www.bettycrocker.com/recipes/beer-steamed-clams-on-a-gas-grill/638837b3-c2a6-4db9-b2b4-8de7cb838db1 (Year: 2011).*

(Continued)

*Primary Examiner* — Drew E Becker
(74) *Attorney, Agent, or Firm* — Fitch, Even, Tabin & Flannery, LLP

(57) ABSTRACT

A grill accessory creates a steaming chamber on a grill that has a heat source and a rack of spaced-apart bars over the heat source. The grill accessory includes a cover configured that covers a food item and forms a steaming region below the cover. The cover operates in connection with a vapor generator that receives and holds fluid beneath the cover. The vapor generator has at least one vent opening to release steam into the steaming chamber. The grill accessory is configured so that it can rest upon the grill rack of spaced-apart bars, and so that the vapor generator transmits heat to the fluid in the vapor generator to convert the fluid to steam. The vapor generator releases the steam through the vent opening(s) into the steaming region below the cover. The steam can help melt toppings and/or introduce moisture into food items cooked on the grill.

7 Claims, 8 Drawing Sheets

(51) Int. Cl.
| | |
|---|---|
| F22B 1/00 | (2006.01) |
| A47J 37/06 | (2006.01) |
| A47J 36/06 | (2006.01) |
| A47J 36/24 | (2006.01) |
| A23L 5/10 | (2016.01) |
| A47J 33/00 | (2006.01) |
| A47J 27/10 | (2006.01) |

(52) U.S. Cl.
CPC .............. *A47J 27/10* (2013.01); *A47J 33/00* (2013.01); *A47J 36/06* (2013.01); *A47J 36/24* (2013.01); *A47J 37/0694* (2013.01); *F22B 1/00* (2013.01); *A23V 2002/00* (2013.01); *A47J 37/0768* (2013.01); *A47J 2027/043* (2013.01)

(58) Field of Classification Search
CPC .... A47J 36/06; A47J 37/0694; A47J 37/0786; A47J 27/04; A47J 2027/043; A47J 37/0768; F24B 1/00; F22B 1/00
USPC .................. 426/523, 510–511; 99/418, 450, 99/345–347
See application file for complete search history.

(56) References Cited

U.S. PATENT DOCUMENTS

| | | | | |
|---|---|---|---|---|
| 1,337,122 | A | * | 4/1920 | Doak .................... A47J 37/041 99/345 |
| 1,608,223 | A | | 11/1926 | Magoon |
| 1,974,412 | A | * | 9/1934 | Dexter .................... A47J 27/10 126/377.1 |
| 2,010,915 | A | * | 8/1935 | Carpenter ............... A47J 37/01 99/346 |
| 2,088,462 | A | | 7/1937 | Buffum |
| 2,127,968 | A | | 8/1938 | Bailey |
| 2,397,643 | A | * | 4/1946 | Bossetta ............. A47J 37/0688 99/389 |
| 2,588,494 | A | | 3/1952 | Deuel |
| 2,932,293 | A | | 4/1960 | Rassieur |
| 3,022,721 | A | * | 2/1962 | Vath .................... A47J 37/0786 99/345 |
| 3,046,971 | A | | 7/1962 | Hogshire |
| 3,125,016 | A | | 3/1964 | McDowell |
| 3,212,426 | A | | 10/1965 | Lewus |
| 3,270,740 | A | | 9/1966 | Koos, Jr. |
| 3,469,524 | A | * | 9/1969 | Trozzolo ................. A47J 37/10 99/425 |
| 3,744,400 | A | | 7/1973 | Woodruff |
| 3,847,067 | A | * | 11/1974 | Munsey .................. A23L 7/187 99/323.8 |
| 3,908,532 | A | * | 9/1975 | Underwood .......... A47J 37/106 99/347 |
| 3,954,203 | A | * | 5/1976 | Jorgenson .............. A47J 27/21 220/825 |
| 4,010,736 | A | | 3/1977 | Sacomani et al. |
| 4,075,939 | A | | 2/1978 | Horn et al. |
| 4,140,049 | A | | 2/1979 | Stewart |
| 4,320,736 | A | | 3/1982 | Sharon |
| 4,358,992 | A | | 11/1982 | Behnisch |
| 4,498,376 | A | * | 2/1985 | Carey .................... A47J 37/10 426/509 |
| 4,694,816 | A | * | 9/1987 | Fabbro .................... A47J 37/01 126/27 |
| 4,759,342 | A | * | 7/1988 | Lee ......................... A47J 27/04 126/381.1 |
| 4,800,865 | A | | 1/1989 | Setzer |
| 4,976,252 | A | | 12/1990 | Cianciola |
| 5,353,880 | A | | 10/1994 | Green |
| 5,365,833 | A | | 11/1994 | Chen |
| 5,367,951 | A | * | 11/1994 | Purvis .................... A47J 27/04 99/446 |
| 5,427,816 | A | * | 6/1995 | Harlaux .................. A47J 27/16 426/614 |
| 5,501,142 | A | * | 3/1996 | Bailey .................. A23B 4/0526 99/345 |
| 5,511,535 | A | | 4/1996 | Landstrom et al. |
| 5,555,994 | A | | 9/1996 | Chen |
| 5,682,811 | A | | 11/1997 | Kidushim |
| 5,682,873 | A | | 11/1997 | Chambers |
| 6,026,734 | A | * | 2/2000 | Dadez .................... A47J 37/106 99/345 |
| 6,047,694 | A | | 4/2000 | Landstrom et al. |
| 6,062,129 | A | | 5/2000 | Tippmann et al. |
| 6,125,739 | A | * | 10/2000 | Jernigan ................ A47J 43/18 99/345 |
| 6,145,431 | A | | 11/2000 | Tippmann et al. |
| 6,189,528 | B1 | | 2/2001 | Oliver |
| 6,192,792 | B1 | | 2/2001 | Gremillion |
| 6,202,637 | B1 | | 3/2001 | Roberts |
| 6,272,976 | B1 | * | 8/2001 | Berryman ............... A47J 27/04 99/340 |
| 6,293,271 | B1 | | 9/2001 | Barbour |
| 6,360,654 | B1 | | 3/2002 | Cornfield |
| 6,427,582 | B1 | | 8/2002 | Measom |
| 6,502,501 | B1 | | 1/2003 | Simon |
| 6,526,875 | B1 | | 3/2003 | Dzbinski |
| 6,582,745 | B1 | | 6/2003 | Northern |
| 6,942,119 | B2 | | 9/2005 | Christos |
| 7,059,318 | B2 | * | 6/2006 | Cornfield .............. A47J 37/067 126/275 R |
| 7,219,663 | B2 | * | 5/2007 | Cuomo .................. A47J 36/36 126/25 R |
| 7,717,031 | B1 | | 5/2010 | Cornfield |
| 7,832,330 | B1 | | 11/2010 | Thompson |
| 8,006,684 | B2 | | 8/2011 | Lee et al. |
| 8,291,896 | B1 | | 10/2012 | Gonnella et al. |
| 8,381,712 | B1 | | 2/2013 | Simms, II |
| 9,247,847 | B2 | * | 2/2016 | Waterston ............... A47J 36/00 |
| 9,383,108 | B2 | | 7/2016 | Touma |
| 9,622,610 | B2 | * | 4/2017 | Kallos ...................... A23L 5/13 |
| 10,238,133 | B2 | * | 3/2019 | Kallos ...................... A23L 5/13 |
| 2002/0066449 | A1 | * | 6/2002 | Walsh .................... A47J 27/04 126/369 |
| 2002/0100371 | A1 | | 8/2002 | Snoke et al. |
| 2003/0070559 | A1 | | 4/2003 | Victor |
| 2006/0102167 | A1 | | 5/2006 | Driscoll, Jr. |
| 2010/0124596 | A1 | * | 5/2010 | Nelson .................... A47J 36/06 426/523 |
| 2010/0139498 | A1 | * | 6/2010 | Chang .................... A47J 27/04 99/410 |
| 2011/0083563 | A1 | * | 4/2011 | Branson .................. A47J 27/04 99/410 |
| 2012/0067902 | A1 | | 3/2012 | Maffei |
| 2012/0111205 | A1 | | 5/2012 | Coutts |
| 2013/0276643 | A1 | | 10/2013 | Krolick et al. |
| 2013/0298779 | A1 | * | 11/2013 | Gurris ................. A47J 37/0786 99/343 |
| 2014/0000585 | A1 | * | 1/2014 | Touma .................... F24B 1/003 126/9 R |
| 2015/0208847 | A1 | * | 7/2015 | Carson .................... A47J 27/06 99/443 R |
| 2015/0238049 | A1 | | 8/2015 | Jones et al. |
| 2016/0302606 | A1 | | 10/2016 | Kallos |
| 2017/0071405 | A1 | * | 3/2017 | Huang ..................... A47J 37/103 |
| 2017/0099992 | A1 | * | 4/2017 | Clemens ............... A47J 37/0786 |
| 2019/0380524 | A1 | * | 12/2019 | Guegan .................. A47J 27/04 |

OTHER PUBLICATIONS

Nordicware, web page printed Jul. 18, 2016 showing "365 Cheese Melting Dome" product, http://www.nordicware.com/store/product_detail/365-cheese-melting-dome#.VQDHDdLF-r8, 2 pages.

Turbo Cookware, TurboCooker.com, web page printed Jul. 19, 2016 showing "Turbo Cooker Kits" products, http://turbocooker.myshopify.com/collections/4-piece-set, 2 pages.

Turbo Cookware, TurboCooker.com, web page printed Jul. 19, 2016 showing "The Reinvented Turbo™ Cookware Collection," http://

(56) References Cited

OTHER PUBLICATIONS turbocooker.myshopify.com/pages/the-reinvented-turbo-cookware-collection, 6 pages.

* cited by examiner

GRILL ACCESSORY

RELATED APPLICATIONS

This application is a continuation of prior application Ser. No. 15/453,994, filed Mar. 9, 2017, now U.S. Pat. No. 10,238,133 B2, issued Mar. 26, 2019, which is a continuation of prior application Ser. No. 15/132,631, filed Apr. 19, 2016, now U.S. Pat. No. 9,622,610 B2, issued Apr. 18, 2017, which claims priority to U.S. provisional application No. 62/149,879, filed Apr. 20, 2015 and titled "Grill Accessory," which are incorporated by reference in their entirety herein.

FIELD OF THE INVENTION

This patent application relates generally to food preparation, and more particularly to a grill accessory suitable for use in heating food on a grill.

BACKGROUND

When a topping such as cheese is to be melted on the upper surface of a hamburger or other food item, the time required for melting may be undesirably long, particularly where heat is supplied from below. While the topping is melting, the bottom of the food item may be at a significantly higher temperature than the top of the food item for a significant period of time. This can result in portions of the food item becoming scorched, overcooked, or excessively dry.

While cooking or heating food items such as cheeseburgers on a griddle or a flat-top grill, cooks may spray water from a bottle onto the cooking surface adjacent the item to generate steam, then cover the item with a dome to trap the steam for a short period of time, for example, 20 seconds. The steam is thought to accelerate melting of cheese while also adding moisture.

Domes are commercially available in various shapes and sizes, and typically include a handle. Some include additional features. As an example, U.S. Pat. No. 8,926,302 discloses an adjustable food press comprising a dome and a handle assembly attached to a pressing plate inside the dome.

The above-described technique of spraying water onto a griddle or flat-top grill cannot be used with the same effect on a grated grill that has spaced-apart bars, as water will fall between the spaces of the bars. Thus, when it is desired to provide steam in this context, other arrangements must be made. Suggested techniques for providing steam when cooking with this type of grill include, e.g., use of a fairly complex system as disclosed in U.S. Pat. No. 5,501,142.

There is a need for improved apparatus and methods to facilitate application of heated vapor to food items on grills, particularly when melting a topping such as cheese or the like, without undue complication and expense.

SUMMARY

The grill accessory described herein provides a relatively simple and inexpensive way to facilitate melting of cheese or other toppings on food items while adding moisture. In some examples, the grill accessory includes a vapor generator beneath a cover or dome so that a quantity of water or other liquid may be rapidly evaporated to provide steam and accelerate melting of a topping, such as cheese, on a food item under the cover and/or to add moisture. In some examples, the vapor generator may be separate from the cover. In others, it may be attached to or integral with the cover such that the vapor generator and cover may be placed on and removed from the cooking surface as a unit, in a single operation. The vapor generator may rest directly on the grill to facilitate heat transfer, or may be supported by the cover. The vapor generator may include a fluid container, storage device, tray, basin, and/or conduit (e.g., a tube, a channel, or a trough) that receives and/or holds a quantity of fluid (e.g., water). To enable rapid evaporation, the vapor generator may transmit heat to the liquid from a heat source below the vapor generator, and/or may be pre-heated. The vapor generator includes one or more openings that allow steam to release into an interior steaming region below the cover.

The grill accessory is suitable for use on a barbeque grill, an open-flame grill, a charcoal grill, a gas grill, or other grated grills that comprises a plurality of spaced-apart bars above a heat source, where the spaces between the bars facilitate heating of a food item on the bars. The grill accessory may comprise a one-piece apparatus that can be moved as a unit, or alternatively may comprise two or more separate components. In some cases where separate components are provided, they may be attachable to one another for movement as a unit, and may be easily detachable to facilitate cleaning, using the resilience of metal components to facilitate attachment and detachment with or without requiring use of tools, e.g., with a vapor generator acting as a spring clip to attach to a bottom edge of a dome.

DETAILED DESCRIPTION

Figure 1:
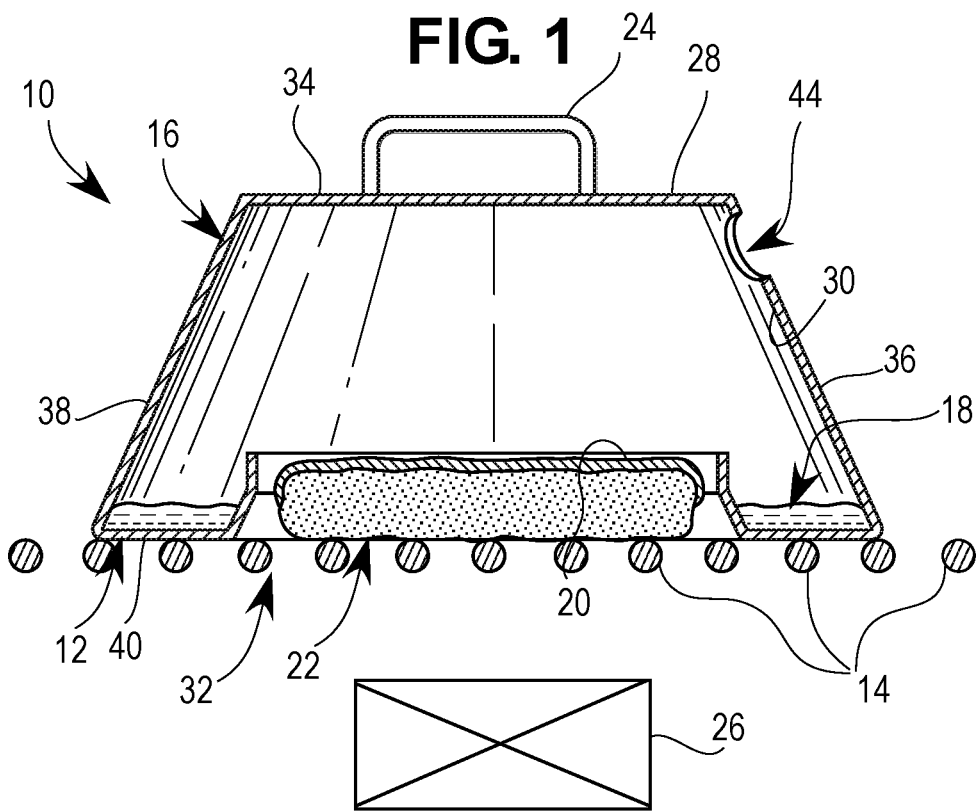
FIG. 1 is a sectional elevational view showing an example of a grill accessory in accordance with the present disclosure.

The present application describes various examples and embodiments of a grill accessory and/or grill kit designed to provide a steaming chamber on a grated grill. A grated grill (also referred to as a barbeque grill), as that term is used throughout this application, refers to a grill having a heat source, and a rack of spaced-apart bars over the heat source. The spaced apart bars on a grated grill support food products during cooking, and allow the heat source to provide heat to the food product. Such grated grills are commonly used for outdoor cooking, as the heat source may involve an open flame or large amounts of a burning substance (e.g., burning charcoal, wood, propane gas, natural gas, etc.) that yields high heat levels or by-products that are difficult to vent indoors. While the described grill accessories are suitable for use on such grated barbeque grills, it should be noted that the described grill accessories could be used on other cooking surfaces as well.

The present disclosure describes examples of grill accessories and related equipment that can be used to form a steaming chamber on a grated grill. The exemplary products provide a vapor generator that maintains fluid (e.g., water) beneath a cover and above or below a grill rack in a manner that allows the fluid to be heated by the heat source to generate steam or vapor beneath the cover. Placing the grill accessory over a food item, and generating steam therein, may enable certain toppings (e.g., cheese placed upon a hamburger) to melt more quickly, more efficiently, and/or more evenly. This can also help avoid unwanted overcooking of the food item by reducing or eliminating any need for added cooking time to melt the topping. The grill accessory can also help add moisture to the food item and it can help soften the topping, thereby facilitating the melting even further. This can be particularly helpful for toppings that may be more difficult to melt, such as denser or dryer cheeses.

In many situations, the fluid used in connection with the described grill accessory will be water, and the vapor generated by the vapor generator will be water vapor, or steam. However, other fluids and/or ingredients can be used in place of, or in addition to water. For example, the described grill accessory can be used with gravies, sauces, juices, sweeteners, flavor additives, or other components that can enhance the flavor, texture, or quality of the cooked food item. The terms "steam" and "vapor" as used in this application are intended to include without limitation water and substances other than water in a gaseous state or in a cloud, mist, suspension or diffusion of droplets or the like produced by heating a liquid.

The vapor generator may be attached or attachable to the cover, such that the grill accessory can be added to or lifted off the grill as a single object. Additionally and/or alternatively, the vapor generator may be separate or separable from the cover, such that the cover can be removed from the grill while the vapor generator remains on the grill. The fluid can be added to the vapor generator before, during, or after it is placed on the grill over a food item. For example, the steam chamber may be placed over the food item, and then fluid can be added through an intake or inlet port in the cover that directs the fluid to the vapor generator. Alternatively, fluid can be added to the vapor generator before it is placed on the grill. In either case, fluid can be added to the vapor generator from a separate source, such as a water bottle.

In some modes of operation, the grill accessory can be pre-heated, for example, by being placed on the grill prior to use. By pre-heating the grill accessory, the vapor generator, which can be formed from a heat conductive material, such as a metal, may instantly or nearly instantly turn fluid into steam upon contact. This can provide a satisfying sizzling effect during cooking, while also facilitating the rapid generation of steam. Such rapid steam generation can facilitate prompt melting of a topping so that the food item does not remain on the grill longer than desired for optimal cooking. In other modes of operation, the grill accessory will not be pre-heated on initial use.

Figure 2:
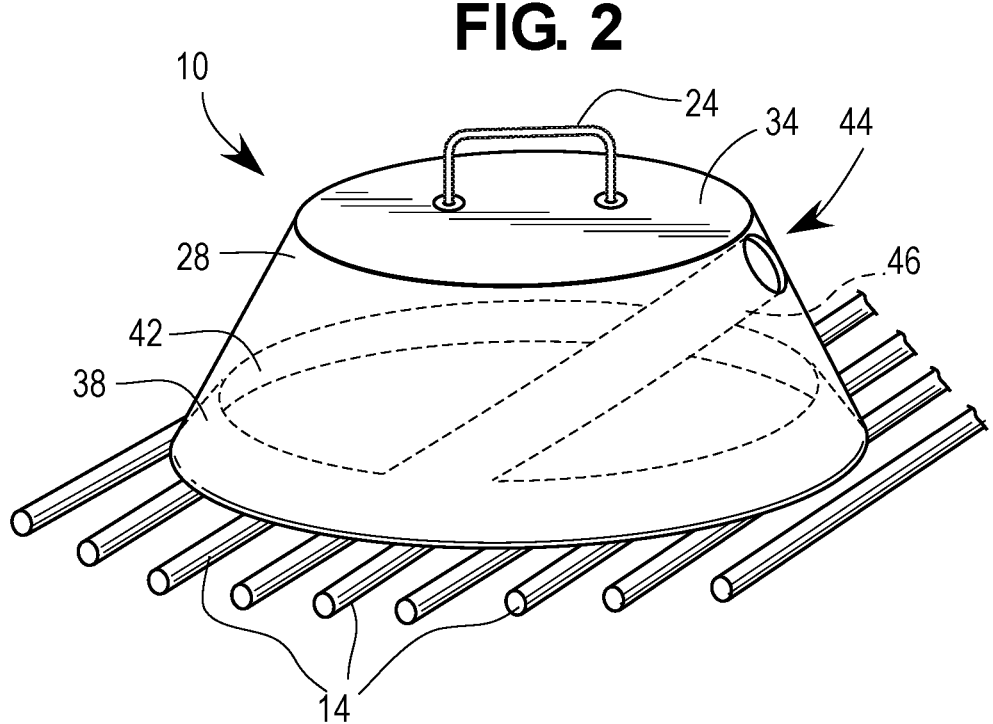
FIG. 2 is a diagrammatic perspective view showing another example of a grill accessory in accordance with the present disclosure.

As will be described below, the grill accessory can take on a variety of different configurations, and may utilize a variety of different components. For example, FIGS. 1 and 2 show examples of a grill accessory 10 resting upon a rack of spaced-apart bars 14 on a grated barbeque grill. The grill accessory 10 comprises a vapor generator 12 that is supported by the bars 14 of a grill beneath a cover 16 or dome so that a quantity of water 18 may be rapidly evaporated to provide steam to accelerate melting of a topping (e.g., cheese 20) on a food item 22 under the cover, and/or to add moisture to the food item. The cover 16 may include a handle 24.

The grill accessory 10 is suitable for use on grated grill with a grill rack that comprises a plurality of bars 14 having spaces therebetween and a heat source 26 therebeneath, with the spaces between the bars facilitating heating of a food item on the bars. The heat source can include a flame, for example, from burning gas, coals, or woodchips, or a radiant heat source such as hot coals or an electric burner. The grated grill may have a lid that covers the entire grilling surface thereof, e.g., a hinged lid or a removable lid.

The cover 16 is capable of at least partially covering a food item 22. In some instances, the grill accessory 10 is configured to cover a specific food item, such as a hamburger. In this way, the cover 16 may have a round configuration, with an outer diameter sufficiently large enough to comfortably surround a typical hamburger patty. In some instances, the cover 16 may be configured so as to cover multiple food items 22 (e.g., multiple hamburgers).

The cover 16 of FIG. 1 has an outer surface 28, and inner surface 30 and a bottom opening 32. The cover 16 is of a generally circular configuration as viewed in plan, however, the shape of the cover can also take on other configurations depending on the shape and size of the food item that it is intended to work with. In some embodiments, the cover may have a width or diameter of about 5 to 7 in., about 7 to 9 in., or about 9 to 12 in. In other embodiments, the cover may have a larger or smaller width or diameter, depending on the internal structure of the grill accessory 10, the size, location, and configuration of the vapor generator 12, and the size, shape, and quantity of the food item(s) 22 that the grill accessory 10 is designed to operate with.

The cover 16 of FIG. 1 has a flat top 34 with a frusto-conical side wall 36. In other embodiments, the cover may have a hemispherical or dome configuration, or a trapezoidal or pyramidal shape. It may be rectangular, square, oblong or elliptical in plan, or may have another shape. In some examples, the cover 16 may have a design that takes on a novelty shape, such as a shape similar to that of sporting apparatus (e.g., a football, basketball, or baseball), a letter, or a logo for a sports team or corporation. The cover may be painted, colored, wrapped, embossed or otherwise provided with two-dimensional or three-dimensional features that enhance the design for novelty purposes. In some examples, the cover 16 may be equipped with printed instructions, recipes, or tips for grilling on the outer surface of the cover 16.

The vapor generator 12 is capable of being supported by the grill bars 14, and capable of receiving and temporarily holding fluid beneath the cover while the fluid 18 is heated by the heat source and/or the already heated vapor generator 12 so that steam can be generated and partially contained by the cover. The vapor generator can include one or more components, including a storage component (e.g., a basin, tray, bowl, trough, channel or other receptacleetc.) for storing and holding fluid, as well as a conduit (e.g., a channel, tube, pipe, hose, etc.) that facilitates the movement or transporting of fluid from one location to another. For example, the vapor generator may include a conduit that transports fluid from a fluid intake or inlet port to the storage unit trough to help assure that the fluid can be easily applied to the vapor generator 12 without splashing, spraying, or other dispersion. In other instances, the vapor generator may include only one of a storage unit and a conduit. For instance, the vapor generator may include a storage unit that is in direct fluid communication with the fluid inlet port, for example, where the fluid inlet port is directly over a tray or trough. Alternatively, in another example, the vapor generator may include only a downwardly sloping conduit coiled around an interior of the cover 16 and sealed at a lower end, so that the fluid is heated and converted to steam as it travels along the length of the conduit.

In the embodiment of FIGS. 1 and 2, the vapor generator 12 and cover 16 are components of a one-piece apparatus that can be manually placed on a grill surface in a single operation and thereafter removed therefrom in a single step. The vapor generator 12 includes an interior peripheral bottom channel on the cover 16. The illustrated channel of FIG. 1 has an outer wall 38 that comprises a lower portion of the side wall of the cover 16, a flat bottom wall 40 extending horizontally inward therefrom, and an inner wall 42 that extends upward from the bottom wall and is curved and inclined toward the outer wall so that the inner and outer walls are somewhat convergent to inhibit or limit boiling fluid from spilling over the upper edge of the inner wall. In other embodiments, the bottom channel may have a different configuration, e.g., it may have an outwardly convex bottom wall with a constant or variable radius of curvature, a V-shaped cross section (as shown in FIG. 2), or another configuration.

In some embodiments, the vapor generator is designed to be filled with fluid prior to being placed on a grill. For example, the vapor generator 12 may include a tray or trough that can be filled with fluid and then attached to, or placed underneath the cover. In other examples, the vapor generator 12 is designed to be filled while already on the grill. In such a situation, the grill accessory 10 and/or the vapor generator 12 can be pre-heated, to effect an instant or near instant flash of steam upon introduction of fluid. In this manner, the cover may include a fluid inlet port 44, or intake port, through which fluid can be introduced to the vapor generator 12 via a fluid source, such as a water bottle or the like.

The grill accessory of FIG. 2 is shown having has a fluid intake port 44 or opening to permit fluid to be introduced into the cover 12, and a conduit 46 extending downward along the interior of the cover for receiving fluid introduced through the inlet port 44 and carrying the fluid to the bottom channel. The conduit 46 may have an open top to permit steam to escape from the conduit along its length. In some examples, the conduit 46 may have a narrow slit that extends along the top of the conduit for this purpose along the length of the conduit 46. In other examples, the conduit 46 may have a series of holes punctured or drilled along the length of the conduit, through which steam may escape.

The grill accessory 10 may further comprise a closure for covering the inlet port 44. The closure may be movable between an open position for admitting fluid and a closed position for preventing or limiting egress of steam. The closure may comprise a spring-loaded member that deflects inward by pressure from a protrusion, such as the spout or nozzle of a water bottle.

The bottom wall 40 of the vapor generator 12 may have a sloped upper surface to facilitate distribution of fluid 18 about the channel. More specifically, the upper surface of the bottom wall 40 may be inclined away from the bottom of the conduit. To this end, the bottom of the channel may have a maximum thickness of, for example, 4 mm. adjacent the bottom of the conduit, with the thickness gradually decreasing about the circumference of the vapor generator.

In some examples, the grill accessory 10 may include one or more functional accessories such as a timing device to indicate how long the cover 16 has been over the food item. The timing device can include an alarm or a countdown clock to help the user determine when the meltable topping 20 should be sufficiently melted. Because the cover is designed to be placed on a grill that is subject to high temperatures, thermal insulation may be provided so that the high temperatures do not damage the timer. Additionally and/or alternatively, the timer may employ only mechanical functionality with high temperature resistance capabilities, such as a spring wound clock, or an hourglass. In still other examples, the grill accessory 10 may include a thermometer with a display external to the cover 16 that represents one or more of the internal temperature of the grill, the surface temperature of the grill accessory 10 or the vapor generator 12, and the internal temperature of the steaming chamber beneath the grill accessory 10. The thermometer may include one or more sensors inside or outside of the cover, and/or on the exterior surface of the cover.

Figure 3:
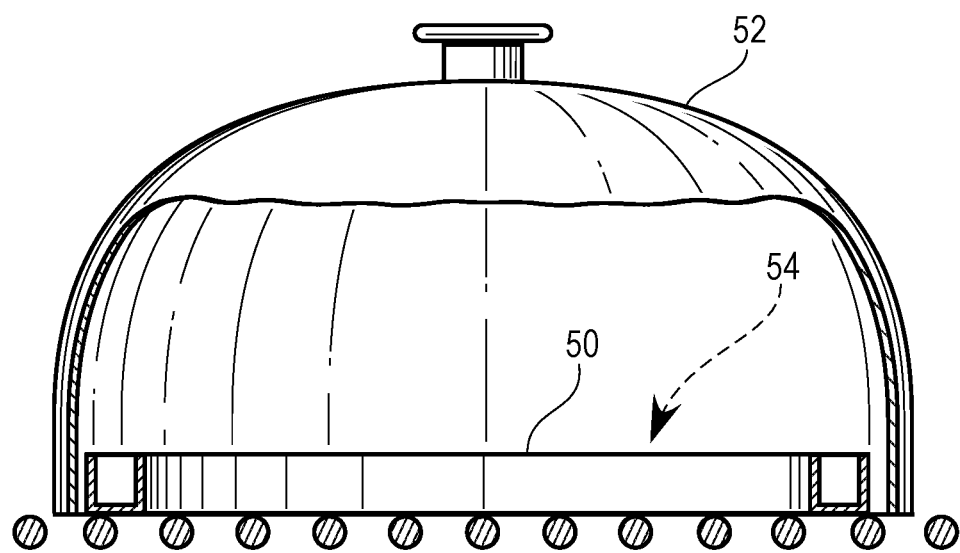
FIG. 3 is a sectional elevational view showing an example of a grill accessory where a cover and vapor generator are detached and/or detachable.
Figure 4:
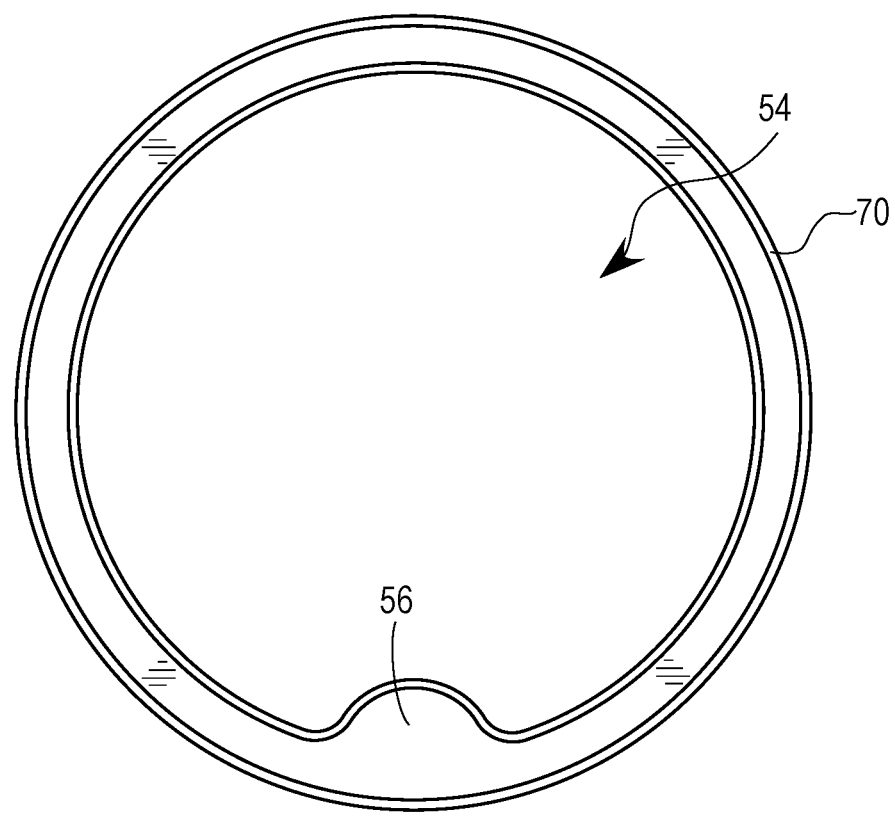
FIG. 4 is a plan view showing the vapor generator of FIG. 3.

FIGS. 3 and 4 illustrate a second embodiment comprising a vapor generator 50 and a separate cover 52. The vapor generator 50 comprises a channel that defines a closed curve with a central opening 54 as viewed in plan so that the vapor generator may surround the base of a food item while generating vapor without inhibiting heating of the food by a heat source beneath the grill bars. The vapor generator 50 as viewed in plan has a bulge 56 or widened region to facilitate receiving fluid 18 in that region, which may be omitted or varied in another configuration.

Figure 5:
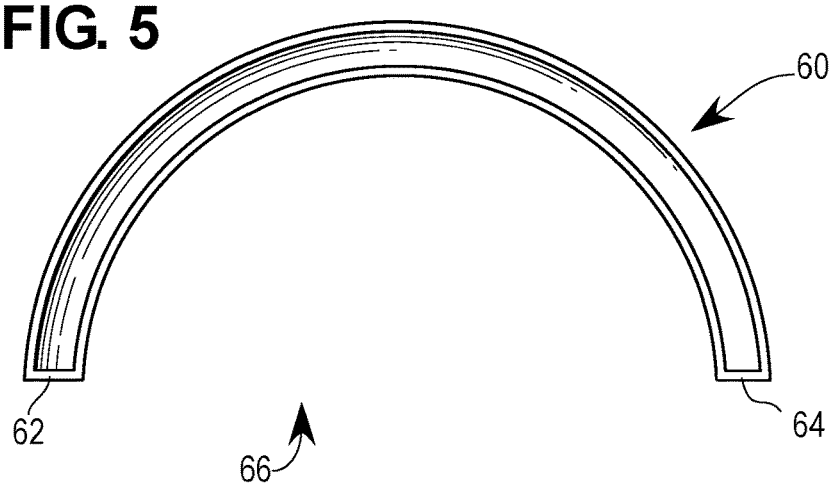
FIG. 5 is a plan view showing an example of a detached and/or detachable vapor generator in accordance with the present disclosure.
Figure 6:
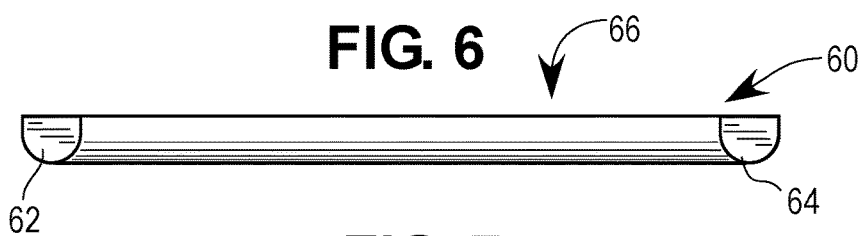
FIG. 6 is an elevational view of the vapor generator of FIG. 5.

FIGS. 5 and 6 illustrate a third embodiment comprising a vapor generator 60 in the form of a channel that has a generally C-shaped or semicircular configuration as viewed in plan so that it may partially but not fully surround a food item while generating steam. The channel has first and second ends 62 and 64 spaced from one another to define an opening 66 through which a utensil such as a spatula may be inserted to facilitate removal of the food item from the grilling surface without requiring removal of the vapor generator.

Figure 7:
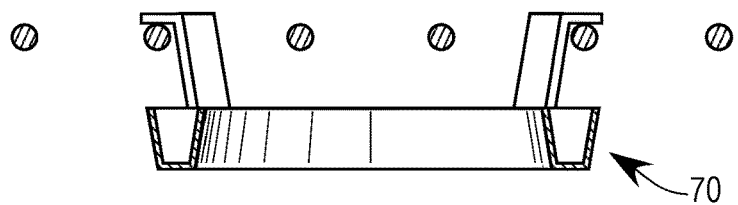
FIG. 7 is an elevational view showing another example of a vapor generator that can be placed below a grill in accordance with the present disclosure.
Figure 8:
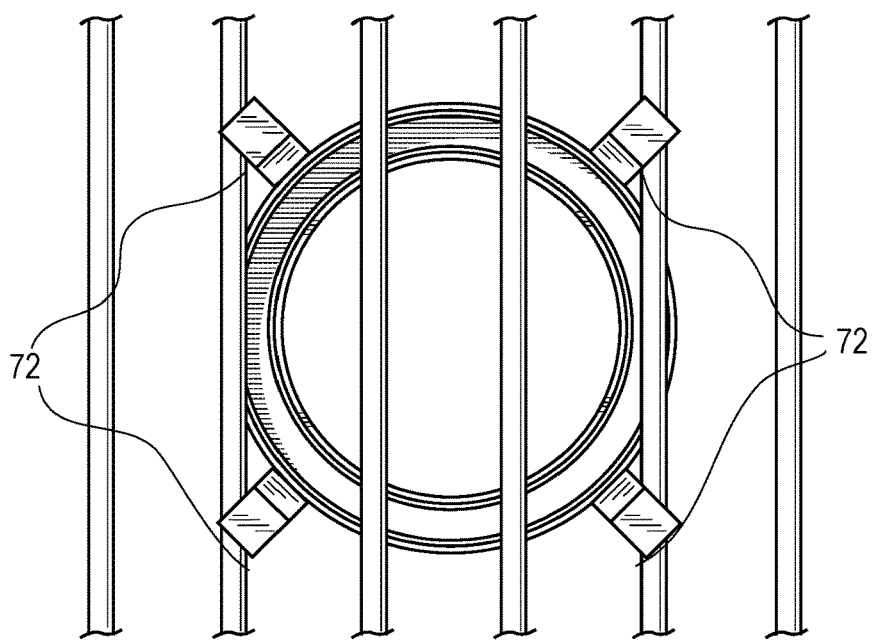
FIG. 8 is a plan view of the vapor generator of FIG. 7.

FIGS. 7 and 8 illustrate a fourth embodiment in which a vapor generator 70 is suspended beneath the grill bars. The vapor generator comprises a generally circular channel having support members 72 extending upward between pairs of grill bars 74 and outward to overlie the grill bars. The illustrated support members may be flexible, or may be pivotably attached to the channel, or may be otherwise movable to facilitate engagement with the grill bars and removal therefrom.

Figure 9:
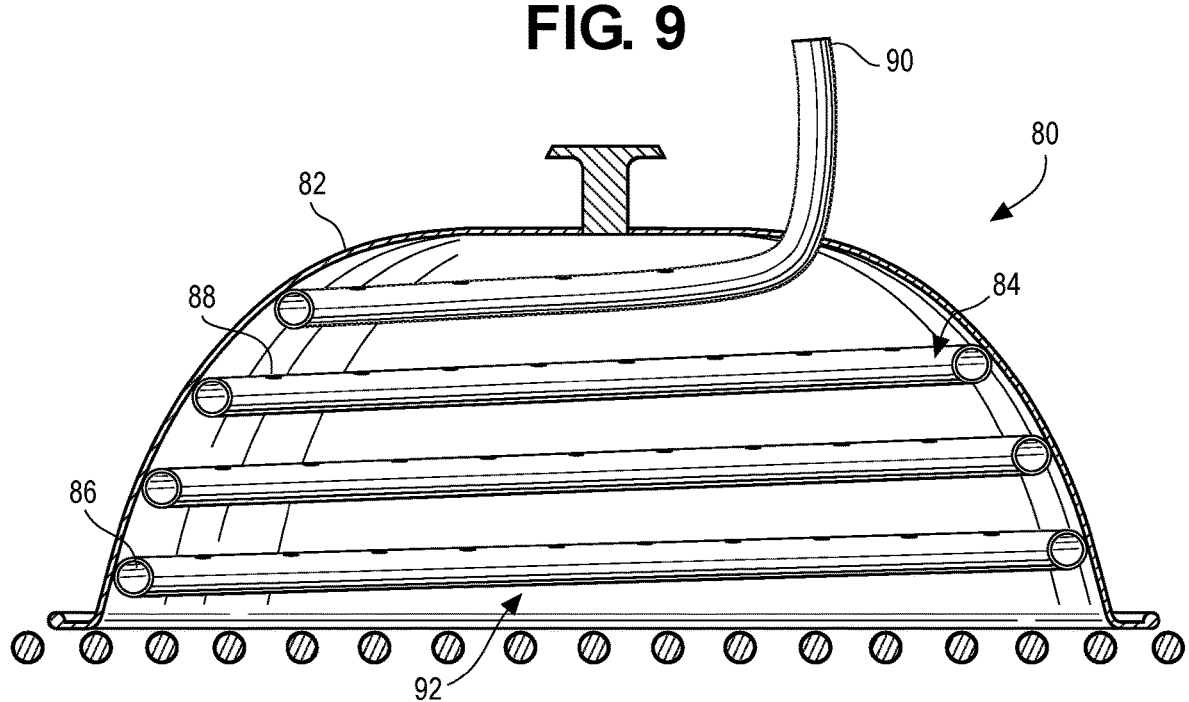
FIG. 9 is a sectional elevation view showing an example of a grill accessory with a coiled vapor generator in accordance with the present disclosure.
Figure 10:
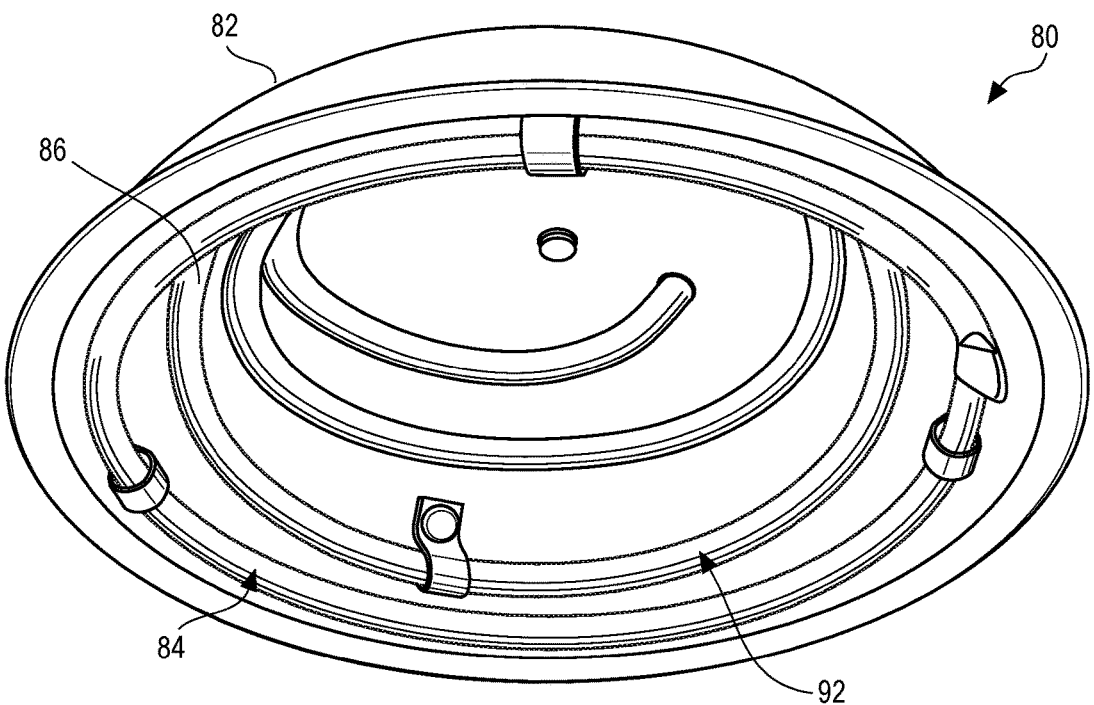
FIG. 10 is a bottom perspective view of the grill accessory of FIG. 9.

FIGS. 9 and 10 show another embodiment of a grill accessory 80 with a vapor generator 84 attached to a cover 82 such that the accessory 80 operates as a one-piece component. FIG. 9 is a cross-section of a front elevation of the grill accessory 80, and FIG. 10 shows a bottom perspective view of the grill accessory 80, thereby showing an interior space, or steaming region 92 of the grill accessory 80.

In FIGS. 9 and 10, the cover 82 has a hemispherical, or dome configuration. The vapor generator 84 comprises a conduit 86 coiled around the interior surface of the cover 82. In this embodiment, the vapor generator 84 consists only of a conduit 86 and no storage unit, however, due to the length of the conduit 82, the vapor generator 82 has enough storage capacity to generate sufficient amounts of steam. The conduit 86 is shown here as a pipe or tube with a series of holes 88 on an upper surface, through which steam can be released into an interior space, or steaming region 92, below the cover 82. In some examples, rather than holes 88, the conduit 86 may include a single long opening, such as a slit, that allows steam to escape into the steaming region 92. In other examples, rather than a pipe or tube, the conduit may be a channel or aqueduct with an open top, through which steam may escape.

An inlet port 90 permits water or other fluid may be introduced into the vapor generator 84. The inlet port 90 can be a hole in the cover 82 adjacent an upper end of the conduit 86, or an opening at the top of an extension of the conduit 86 to the outside of the cover 82. The inlet port is configured to receive fluid, such as water, so that the fluid can be delivered to the vapor generator 84. In some examples the inlet port 90 can include a closure mechanism, such as a valve (e.g., a one-way valve) that allows fluid to enter through the inlet, but inhibits and/or prevents the egress of the fluid and/or steam in a reverse direction. In other examples, the closure mechanism may be an internal, spring-loaded hinged flap, configured to close the inlet port 90 absent external forces in a positon of stable equilibrium, while being capable of being pressed inward by a protrusion (e.g., a spout or nozzle to a water bottle) so that fluid may be introduced into the vapor generator 94.

The conduit 86 can be formed from or include a heat conductive material such as steel, aluminum, copper, or other conductive metals. The conduit 86 can absorb heat so as to be pre-heated by being placed on the grill prior to introduction of fluid. The pre-heated conduit 86 can cause fluid introduced through the inlet port 90 to rapidly turn to steam. That is, the heated conductive surface of the conduit 86 heats the fluid to its boiling point quickly, so that the introduction of water instantly or nearly instantly generates a flash of steam. This can allow the grill accessory to provide steam instantly so that a topping can melt quickly, so that the food item covered by the topping does not overcook during the melting/steaming process. It is thought that the generation of steam in this manner can increase the rate of heating of a topping that is partially insulated by an underlying food item from the heat source.

The conduit 86 may be sealed at its lower end location to inhibit fluid from draining out from the end of the vapor generator 84. The end may be sealed by a screwed-on cap, or by being pinched, welded, or plugged in a water-tight manner, for example. In other configurations, the conduit 86 may lead to a storage unit, such as a trough, a basin, a tray, bowl, or the like.

In some forms, the conduit 86 may be a separate tube or pipe that is fitted to the cover during manufacture. For example, the conduit 86 can be bent and then attached to the inner surface of the cover 82 via brackets, clips, welding, or other attachment techniques. The conduit 86 can be configured so that it is removable from the cover 82, which can be advantageous for cleaning the grill accessory 80, in particular the conduit 86. This may be particularly useful, for example, where fluids other than pure water are introduced into the vapor generator 84, as such fluids may leave behind organic residue or other particulate inside the conduit 86 that necessitate periodic cleaning.

Figure 11:
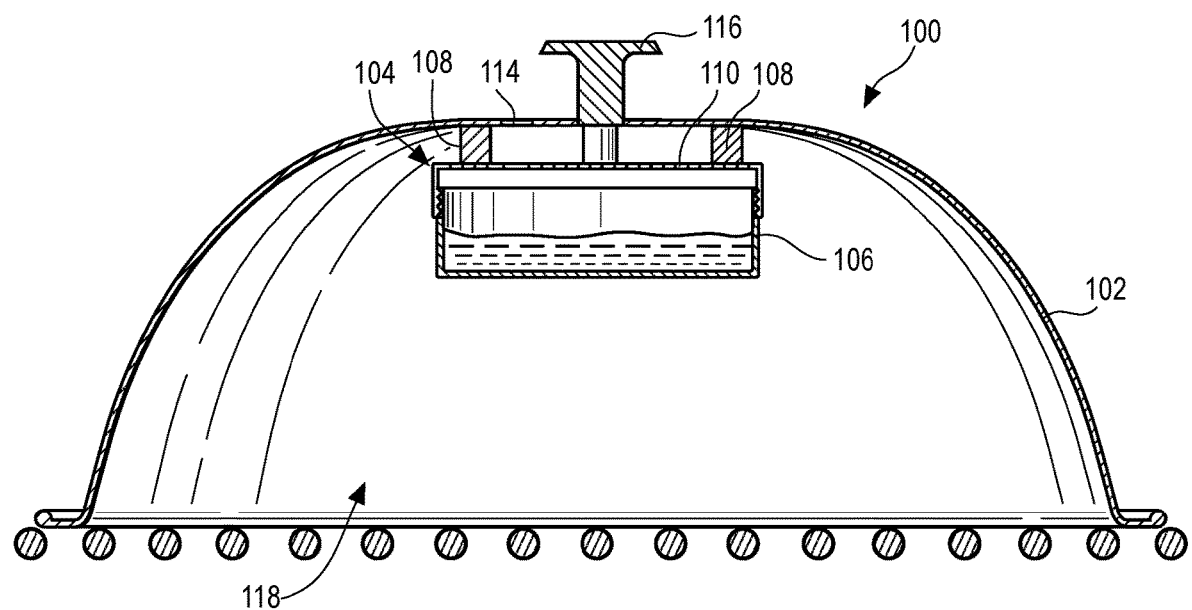
FIG. 11 is a sectional elevation view showing an example of a grill accessory with a suspended vapor generator in accordance with the present disclosure.
Figure 12:
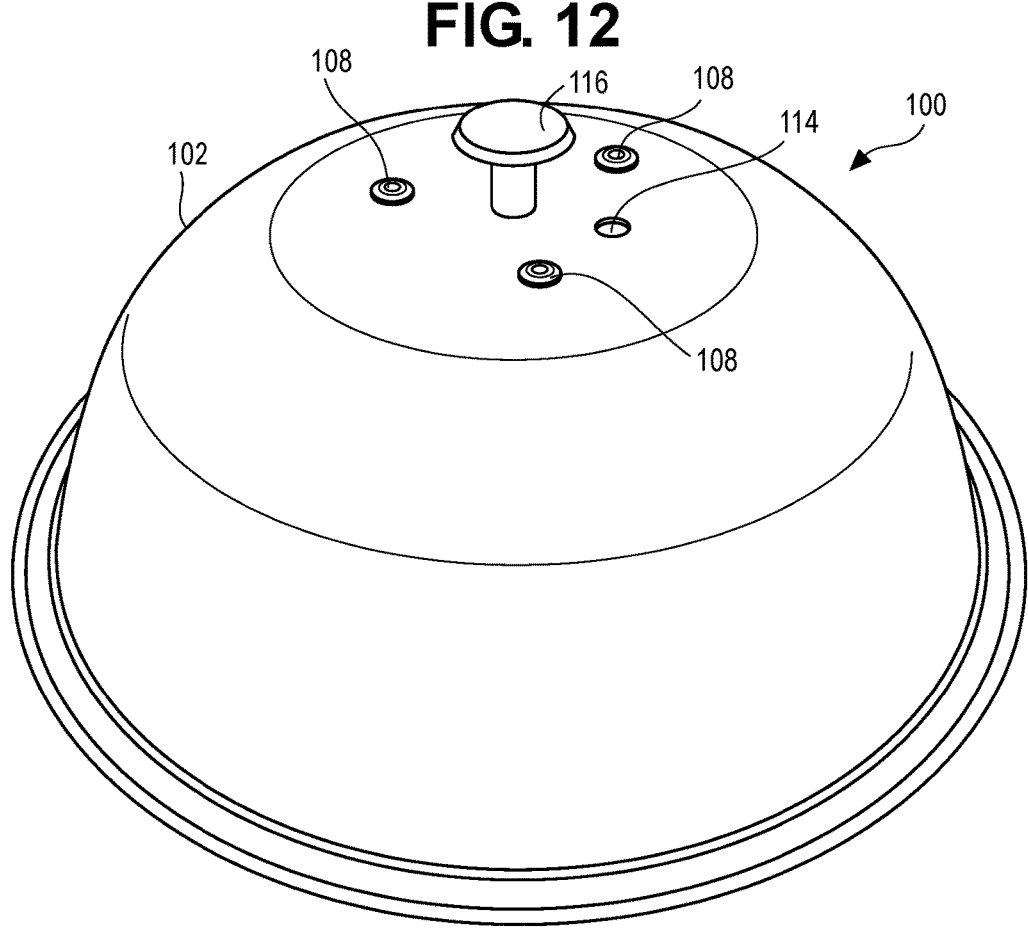
FIG. 12 is a perspective view of the grill accessory of FIG. 11.
Figure 13:
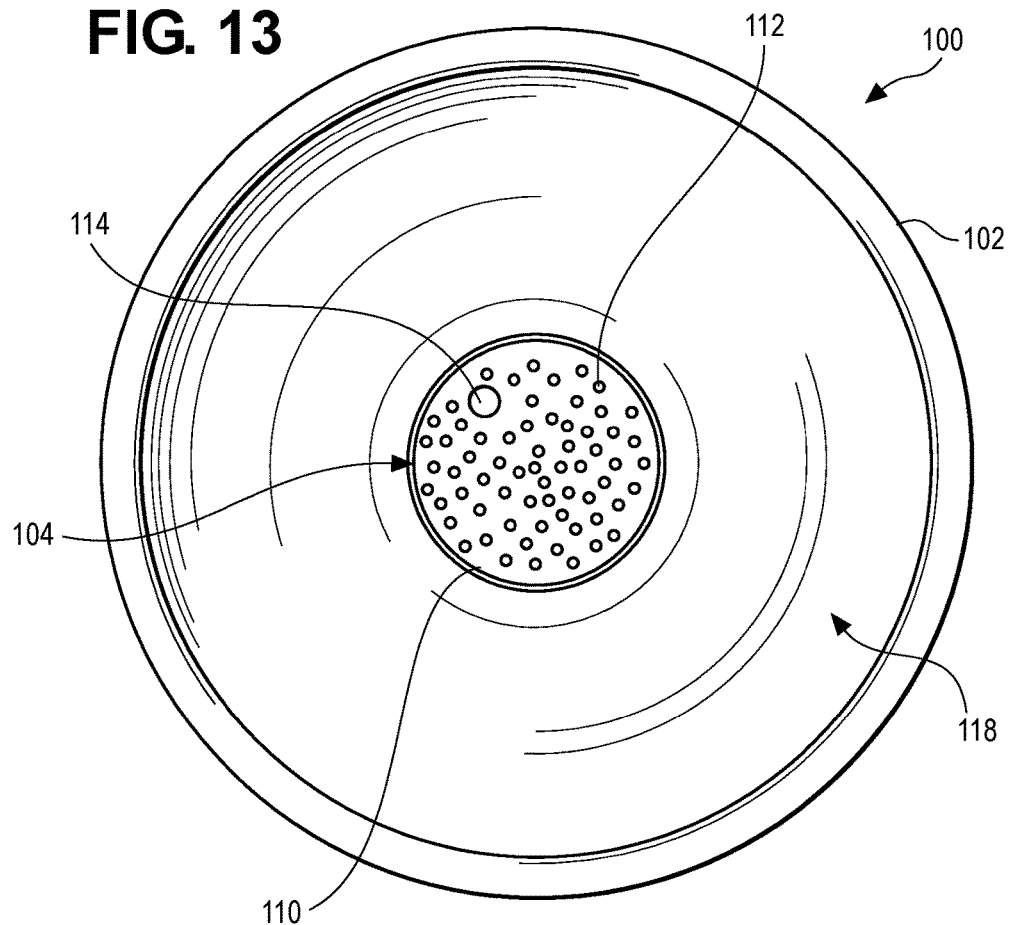
FIG. 13 is a bottom view of the grill accessory of FIG. 11 in a configuration with a tray removed.

As shown in FIGS. 9 and 10, the vapor generator is primarily a conduit that coils around the interior of the grill accessory. In some forms, the vapor generator may be a storage unit that lies below an intake port within the steaming region below the cover. FIGS. 11-13 show an example of a grill accessory 100 that includes a cover 102 and a vapor generator 104 suspended from the upper region of the cover 102.

The vapor generator 104 of FIGS. 11-13 comprises a tray 106 configured to hold a quantity of fluid. The tray attaches to an upper lid 110, which is suspended from the top of the cover 102 via a suspension mechanism 108. The suspension mechanism 108 may comprise an array of fasteners such as screws or bolts that attach the vapor generator 104 to the cover 102. In other examples, the suspension mechanism 108 may be an extension of a portion of a handle 116 that extends into interior steaming region 118 beneath the cover.

In the suspended design of FIGS. 11-13, the tray 106 may be removable from the upper lid 110 so that the tray 106 can be cleaned and, in some situations, filled with a fluid outside the grill. The tray 106 may attach to the upper lid 110 via corresponding threaded portions on the lid 108 and the tray 106. Alternatively, the tray 106 may mount to the upper lid 110 via a bayonet connection, a snap fit connection, a quick-connect fitting, or similar mounting system. In some embodiments, the tray 106 may not be separable from the vapor generator 104.

As noted, the tray 106 of the vapor generator 104 can be removed from the upper lid 110 so that it may be filled with a fluid before being reattached and placed on the grill. However, in some examples, it will be more desirable to fill the tray 106 with fluid after the grill accessory 100 has already been on the grill. Because in this situation the components of the grill accessory 100 may be hot to the touch, the cover 102 of the grill accessory may be equipped with an intake/inlet port 114 that is in fluid communication with the vapor generator 104. For example, the inlet port 114 may be directly above the tray 106, so that fluid introduced through the inlet port 114 deposits directly into the tray 106. In other configurations, the vapor generator 104 may further comprise a conduit that communicates between the inlet port 114 and the tray to transport fluid therebetween.

As shown in FIG. 13, the upper lid 110 of the vapor generator 104 may include one or more openings or holes 112 to release the steam generated by heating fluid in the tray 106 into the interior steaming region 118 beneath the cover. The holes 112 can be provided in a prescribed matrix pattern, or in other arrangements as desired. For example, the holes 112 may be provided in a spiral or other pattern. The holes 112 may be a series of small holes that are of a size sufficient to release steam, but still capable of impeding fluid from splashing out of the tray 106. The size and quantity of the holes can vary depending on a number of factors including, for example, the amount of steam desired, the food item intended to be cooked on the grill, the type of fluid sourcing the steam, the size of the cover 102, the temperature of the grill, and the distance of the tray 106 from the heat source. The upper lid 110 in some instances may include one or only a few holes of a larger size. In other configurations, the upper lid 110 may have a screen type surface. In still other configurations, the upper lid 110 may be arranged with one or more slots or grooves that may be arranged in a particular matter to direct steam in a particular direction or to a particular area.

In some examples, the grill accessory 100 may be usable and interchangeable with a variety of different vapor generators 104 having different configurations of an upper lid 110. For example, the grill accessory 100 may be adaptable so that different vapor generators 104 or different upper lids 110 can be installed in place depending on the intended use of the grill accessory.

Figure 14:
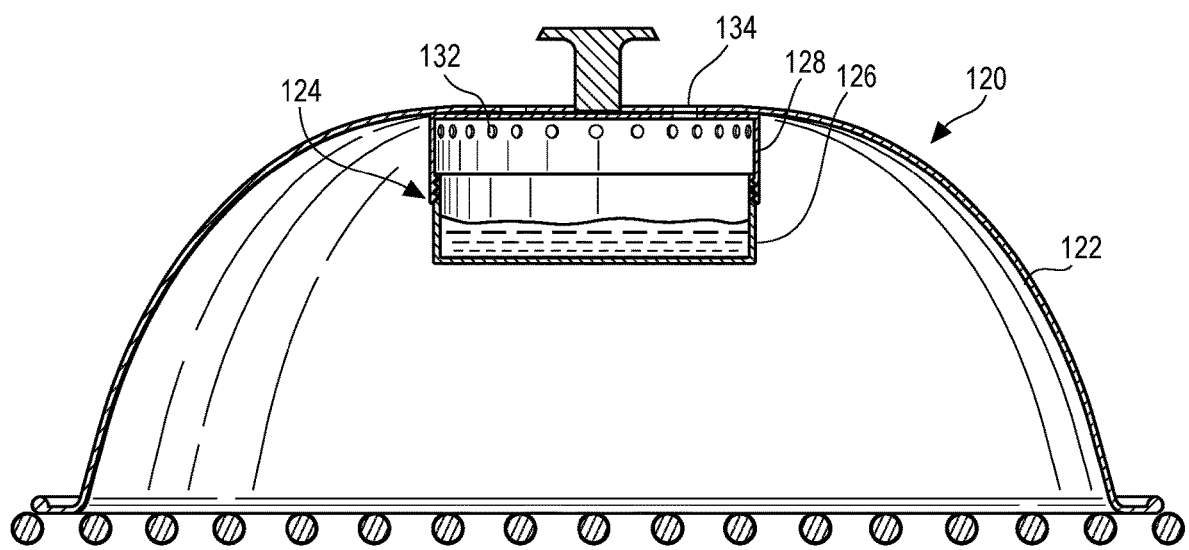
FIG. 14 is a sectional elevation view showing another example of a grill accessory with a suspended vapor generator, with a portion of the cover removed to show internal detail.

FIG. 14 shows another example of a grill accessory 120 that utilizes a suspended vapor generator 124 hanging from an upper surface of a dome shaped cover 122. In this configuration, the tray 126 is attached to a cylinder 128 that extends from the top surface of the cover 122. The cylinder 128 has holes 132 through the outer diameter that allow for the release of steam caused by fluid boiling or evaporating from within the tray 126. As with the embodiment of FIGS. 11-13, the suspended vapor generator 124 of FIG. 14 can be removable from the cylinder 128, for example, via a threaded connection, a bayonet connection, a snap fit connection, a quick-connect fitting, or other mounting system. The tray 126 can be filled with fluid either by being removed from the vapor generator 124, or via an intake port, or inlet port 136, in the top portion of the cover 122, which may have a configuration similar to any of those described herein.

Figure 15:
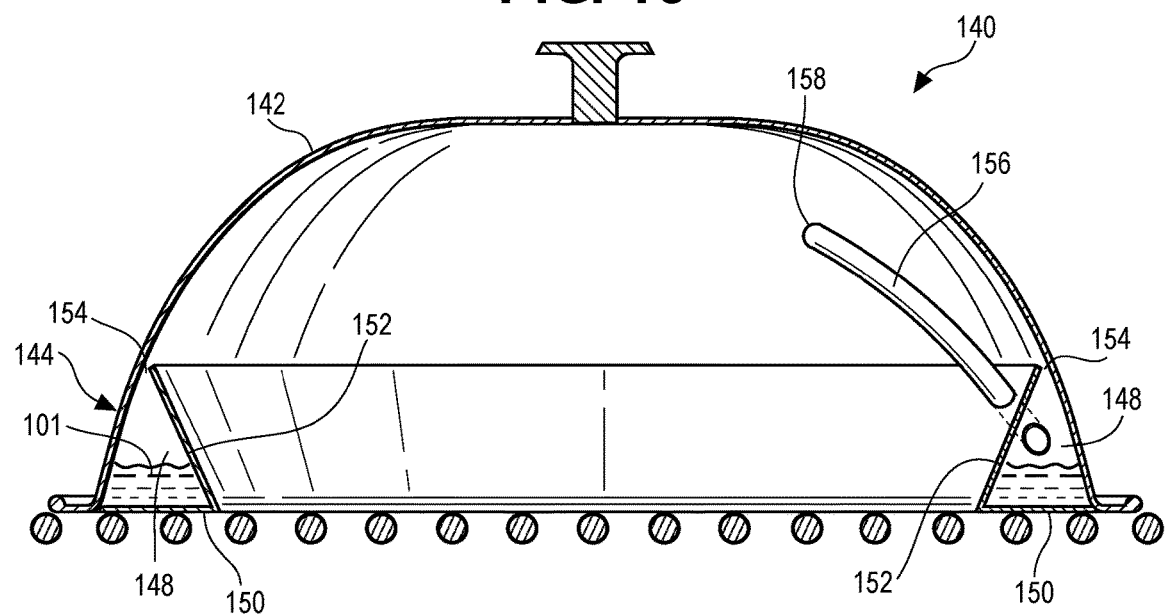
FIG. 15 is a cross-sectional elevation view showing an example of a grill accessory with a vapor generator at a bottom of a cover in accordance with the present disclosure.

FIG. 15 provides another embodiment of a grill accessory 140 for creating a steaming chamber on a grill. FIG. 15 shows a cross section of the grill accessory 140, which includes a dome shaped cover 142 and a vapor generator 144 that has a conduit 156 and a storage unit, or a trough 148. The trough 148 extends around the bottom of the cover 142, whereby a lower portion of the cover forms the outer wall 148 of the trough. The trough 148 has a lower wall 150 and an inner wall 152, which operate together to form a trough or channel that holds fluid 101. In this embodiment, the trough 148 will hold the fluid 101 directly on the grill rack of the barbeque grill, thereby putting the fluid 101 in closer proximity to the heat source. This will allow the trough 148 itself to pre-heat quickly and to generate steam quickly.

In FIG. 15, the inner wall 152 of the trough slopes toward the outer wall so as to inhibit the fluid 101 from splashing or otherwise escaping the trough while in a liquid (i.e., not yet steam) state. The inner wall can be bent near to the outer wall, so as to form an opening 154 of a desired size so as to permit steam to escape and prevent or inhibit liquid from escaping the trough 148.

The trough 148 can be filled with fluid 101 by way of an intake or inlet port 158 that extends through the cover 142. The inlet port 158 can have a closing mechanism as described herein with respect to other inlet ports. The inlet port 158 can communicate directly with the trough 148 or indirectly via a conduit 156. For example, in some situations, the inlet port 158 may be positioned so that the port leads directly into the trough 148 and so that a spout or nozzle introduced through the inlet 158 can inject liquid directly into the trough 148. In other examples, the inlet port 158 may be positioned higher on the cover 142, and may lead directly to a conduit that, in turn, leads to the trough 148, as shown in FIG. 15. The position of the inlet port 158 may depend, in some examples, on the size or height of the trough 148 with respect to the size or height of the cover 142.

Figure 18:
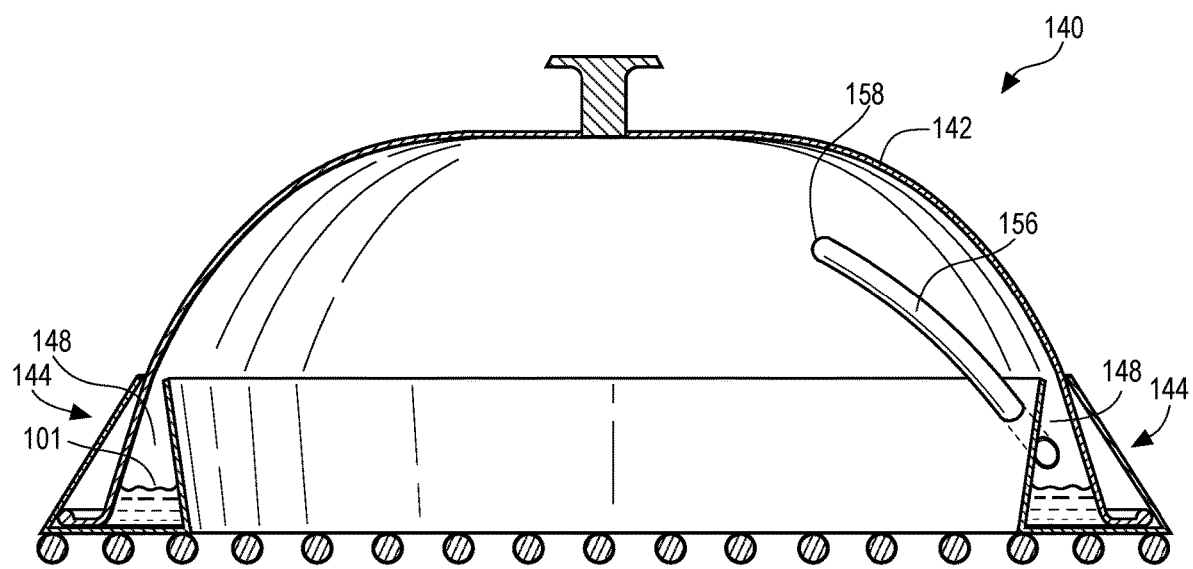
FIG. 18 is a cross-sectional elevation view showing an example of a grill accessory with a vapor generator attached to a bottom of a cover.

FIG. 18 shows another embodiment similar to that of FIG. 15, only where the vapor generator 144 and/or the trough 148 is detachably removable from the cover 142, such that the vapor generator 144 and trough 148 can lift off the grill with the cover 142, but can also be easily detachable to facilitate cleaning. The vapor generator 144 and/or trough 148 may be detachable by way of the resilience of metal components to facilitate attachment and detachment with or without requiring use of tools. For example, the vapor generator 144 may operate as a spring clip that to attach to a bottom edge of the cover 142. That is, the vapor generator 144, or portions thereof, may deflect or deform to release from the cover to enable its removal from the cover 142. Similarly, the vapor generator 144 may flex or deform to so that walls of the vapor generator 144 spread open to receive the cover, and then return to a natural clamping position against the wall of the cover 142.

Each of the various configurations described herein may have particular advantages for particular situations. For example, embodiments that use a vapor generator that rests directly on the grilling surface may be useful for quick heating of the fluid and rapid generation of steam. Further, embodiments that use suspended vapor generators may allow a cover to have a larger bottom opening, thereby being usable to cover larger, or a greater quantity of food items. Examples that have a vapor generator attached (or attachable) to the cover allow the grill accessory to be sold, stored, and used as a single apparatus, whereas examples that use separate (or separable) vapor generators and covers may be less expensive to produce, and may allow the product to be sold as separate or individual components. Accordingly, depending on the intended use, the target consumers, and other objectives, a grill accessory may combine one or more features of the various described embodiments, and/or they may remove or omit other features to form another embodiment that may not be described verbatim herein, but is nevertheless considered within the scope of the described technology.

Figure 16:
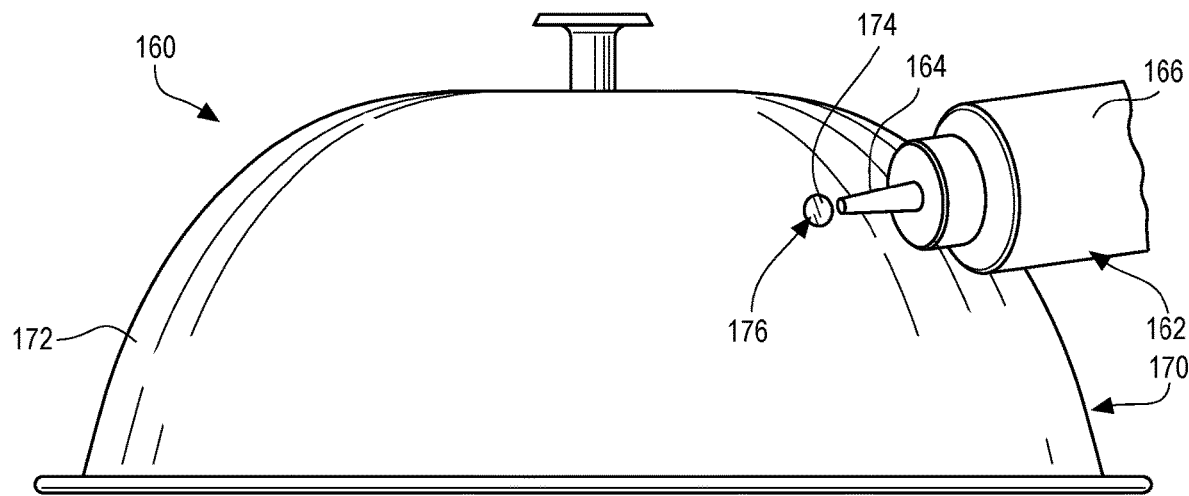
FIG. 16 shows components of a grill kit in accordance with examples of the present disclosure.
Figure 17:
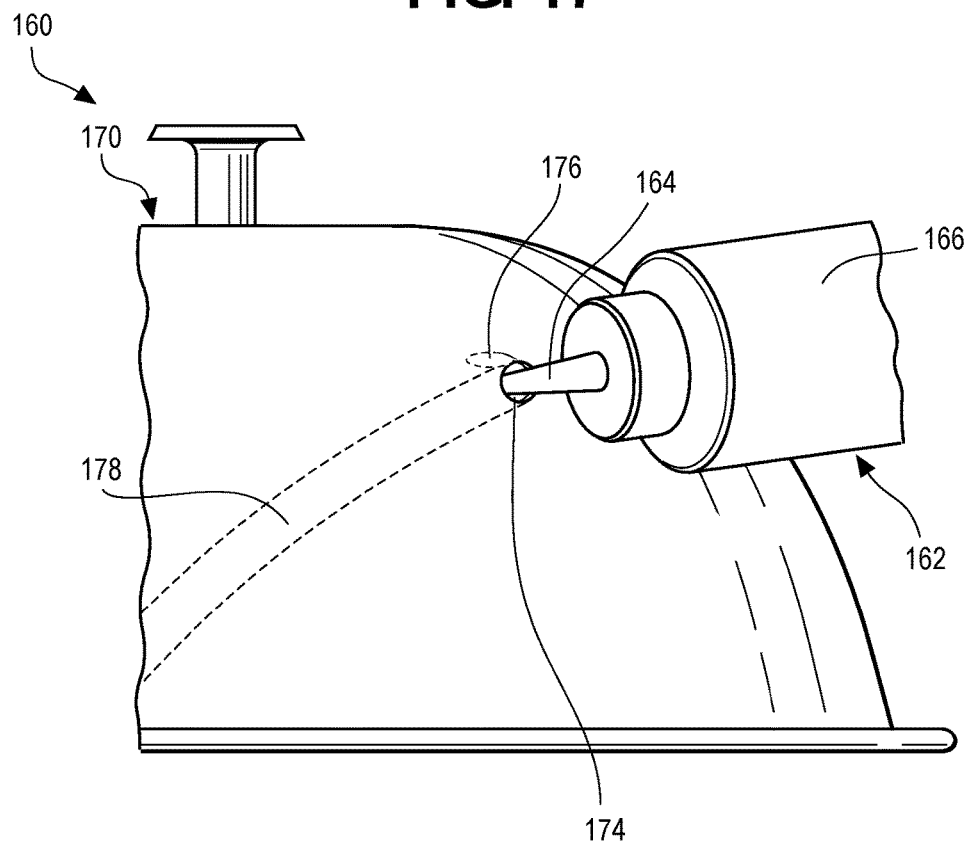
FIG. 17 shows the components of the grill kit of FIG. 16 in another configuration.

FIGS. 16 and 17 show an embodiment of a grill kit 160 that utilizes the grill accessories described herein. The grill kit 160 includes a grill accessory 170, which can be any of the grill accessories shown in FIGS. 1-15 and described herein, and a fluid source or bottle 162. The bottle 162 can be a water bottle with a flexible, resilient body 166 that can be squeezed to eject water out of a spout 164 or nozzle. The grill accessory 170 includes a cover 172 with an intake or inlet port 174 that leads to a conduit 178 or other component of a vapor generator. The inlet port 174 includes a closure mechanism which can be a hinged flap 176 that is rotatable about the inlet port 174. The flap 176 can be a spring loaded internal member that is biased outward toward a closed position, and can be pressed open, for example, by a protrusion that fits within the opening of the inlet port 176, thereby presenting an orifice through which fluid can be introduced.

In the examples shown in FIGS. 16 and 17, the spout 164 of the bottle 162 is configured to operate specifically with the inlet port 174 of the grill accessory 170. That is, the spout 164 has a long and narrow configuration that allows it to press the flap 176 inward and insert into the inlet port 174 of the grill accessory. Once inserted, the spout can inject fluid into the channel 178 or vapor generator, which can convert the fluid into steam. In some embodiments, the bottle 162 and the grill accessory 170 can be provided or sold together as a kit 160. In some examples, the inlet port 174 and the spout 164 of the bottle 162 can be specifically configured to operate together with the spout sealing to the inlet port to prevent or inhibit leakage of fluid during injection.

The grill accessories described herein may have multiple modes of use and operation. For example, the grill accessories may be used by first placing the vapor generator and a food item in proximity to one another on a grill, for example, surrounding or partially surrounding the food item with the vapor generator, and leaving the vapor generator in place for a period of time to preheat it. Fluid (e.g., water) may be thereafter introduced into the channel of the vapor generator, for instance, by use of a squeeze bottle having an elongated, narrow spout. The cover may thereafter be immediately placed over the food item and vapor generator if the cover is separate from the vapor generator. As the fluid is retained by the vapor generator, steam is rapidly generated by the heat source. The steam is partially contained by the cover. That is, the steam is prevented or inhibited from escaping upwardly or outwardly away from the food item. The cover may be left in place for a period of time sufficient to melt a topping such as cheese on the food item, or for another period of time. In some cases, the time period may be, e.g., between 5 seconds and two minutes. In other cases, other time periods may be selected. As one specific, non-limiting example, the cover may be left in place over the food item for about 20 seconds. The cover may then be removed (along with the vapor generator, if the two are connected), and the food item may thereafter be removed from the grilling surface.

These methods can facilitate the melting of toppings on a grilled food item so that the food item does not continue to cook on the grill for longer periods than desired. For example, barbeque grill users may place meltable toppings (e.g., cheese) on food items (e.g., hamburgers) after the food item itself is fully or nearly fully cooked, overlooking the fact that the food item will continue to cook as the topping melts. However, the topping itself may take several minutes to melt, and in some cases (e.g., where that topping is a hard or unprocessed cheese), a prohibitive amount of time, which can result in the food item itself cooking several minutes beyond its ideal cooking temperature. By providing a steaming chamber that operates on a grated grill, the toppings can melt more quickly and efficiently as the added heat and moisture from the steam acts on the topping. In this way, the food item need not continue to cook for periods significantly longer than desired.

The following section will now describe specific examples of grill accessories, kits, and methods in accordance with the present disclosure. It should be understood that these statements are only exemplary, and do not intend to limit the scope of the present technology to the described embodiments alone.

Herein is described a grill accessory that creates a steaming chamber on a grill. The grill has a heat source (e.g., flame, hot coals, or an electric burner) and a rack of spaced-apart bars over the heat source. The grill accessory includes a cover configured to at least partially cover a food item. The cover has a bottom opening and an inner surface, the inner surface defining a steaming region below the cover.

The grill accessory also includes a vapor generator configured to receive and hold fluid beneath the cover. The vapor generator has at least one vent opening. The grill accessory is configured to be supported by the rack of spaced-apart bars on the grill. The vapor generator is configured to transmit heat to the fluid in the vapor generator so that the fluid converts to steam, and to release the steam through the at least one vent opening into the steaming region below the cover.

In one version of the grill accessory, the vapor generator is separate or separable from the cover. In this way, the vapor generator remains on the grill as the cover lifts off the grill. The vapor generator includes a channel that defines a closed curve with a central opening. In this way, the vapor generator may at least partially surround a base of a food item while generating vapor without blocking or insulating the food item from heat from the heat source. In another version, the vapor generator has a C-shape that partially surrounds the food item while also defining a recess that allows a grill utensil (e.g., a spatula) to slide beneath the food item. In some examples, the vapor generator and cover are connected, or connectable (i.e., removably attachable), so that the lifting the cover off the grill simultaneously lifts the vapor generator off the grill.

In one form, the cover includes an intake port (also referred to as an inlet port) that allows fluid to be introduced into the grill accessory. The vapor generator is in fluid communication with the intake port, such that the input port opens directly into the vapor generator, or into a conduit that leads to the vapor generator. In one version, the vapor generator includes a peripheral trough that extends around an inner perimeter of the bottom opening of the cover.

The peripheral trough has an outer wall, a lower surface extending inward from the outer wall, and an inner wall extending upward from the lower surface. In some forms, the inner surface of the cover forms the outer diameter of the peripheral trough, but in other forms, the outer wall of the trough is distinct from the inner surface forming the cover. The peripheral trough has an open top that releases steam into the steaming region below the cover. The inner wall and the outer wall of the peripheral trough are convergent, or angled toward one another to provide a splash shield that inhibits fluid from splashing out of the open top.

In some situations the grill accessory will also have a fluid transfer apparatus, such as a conduit, pipe, tube, duct, channel, or the like, that extends downward along the inner surface of the cover from the intake to the trough. This fluid transfer apparatus receives fluid introduced through the intake port, and delivers or guides the fluid to flow into the peripheral trough. In some examples, the fluid intake port is positioned directly outside of the peripheral trough, so that fluid introduced into the intake port is immediately within the trough. In other examples, the vapor generator includes a conduit coiled around the inner surface of the cover. Such a coiled conduit is connected to the intake port so that fluid received through the intake port enters into the conduit. The conduit itself has at least one vent opening in the form of holes, a slit, or other opening, so that steam from within the conduit escapes into the steaming region under the cover, without the need for a separate fluid storage unit.

In some embodiments, the intake port includes, or operates in connection with a closure. The closure is movable between an open position, whereby fluid can be received through the port, and a closed position that inhibits egress of steam through the port. The closure can utilize a spring-loaded member that deflects the closure inward, and to the open position, in response to pressure applied from a spout of a fluid source, or other apparatus that is narrow enough to fit through the intake port.

The present disclosure also describes examples of methods for preparing a food item on a barbeque grill. As with other examples, the barbeque grill has a heat source (e.g., flame, hot coals, electric burners, etc.) and a plurality of spaced-apart bars over the heat source. The method involves at least partially cooking a food item, such as a hamburger, on the grill. At some point during the cooking of the food item, a meltable topping such as cheese, cheese-like products (e.g., vegan cheese, imitation cheese), butter or compound butter, margarine, sauces (e.g., frozen or solidified sauces), or the like, are placed on top of the food item. Next, a cover is placed cover over the food item and the meltable topping. The cover has a bottom opening and defines an interior region below the cover. In some examples, the cover may be placed over a vapor generator that is already placed on the grill with a fluid therein. Next, the method involves generating steam with a vapor generator. The vapor generator has at least one vent opening, and contains a fluid such as water. Steam is then maintained in the interior region (or the steaming region) below the cover until the meltable topping melts on the food item.

In some methods, the vapor generator is connected or connectable to the cover and is formed from a heat conductive material. Thus, the step of generating steam with a vapor generator can include pre-heating the vapor generator and introducing fluid into the pre-heated vapor generator through an inlet in the cover. In this way, the pre-heated vapor generator heats the fluid to generate steam. For example, introducing fluid into the pre-heated vapor generator may result in a flash of steam that generates a satisfying sizzling effect. In some examples, the step of generating steam with a vapor generator includes introducing fluid into the vapor generator through an inlet port in the cover, and then closing the inlet port with a movable closure that inhibits the egress of steam out of the inlet port. This can be done, for example, using a spout or nozzle on a water bottle that is configured to press inward the closure while injecting fluid into the port, and then removing the spout so that the closure (which may be spring loaded, for example), returns to the closed position against the port.

Other methods may comprises a conduit connected to the cover. The conduit is connected to an inlet port in the cover, and has at least one opening that allows steam to escape from the conduit. The step of generating stem includes introducing fluid from a fluid source into the conduit through the inlet port and heating the fluid to boiling. The step also includes emitting steam through the conduit opening(s) into the interior region below the cover.

The methods described herein can be configured, and the equipment used in association with the methods can also be configured, so that the cover remains in place over the food item for a time period of between about 5 seconds and about two minutes. For example, the products and methods can be configured so that, when the cover is in place over a food item, a topping on that food item will sufficiently melt within about 2 minutes, within about 1 minute, or within about 30 seconds, depending on the meltability of the topping and other factors. In any event, the time needed to melt the topping with the cover in place may be shorter than the time needed to melt the topping without the cover in place.

In some examples, the vapor generator may be separated or separable from the cover, while being supportable by the spaced-apart bars of the grill rack over the heat source. In this way, a method may further include introducing fluid to the vapor generator prior to placing the cover over the food item. For example, the vapor generator may be filled with water or other fluid prior to placement of the cover over the food item. Further, the step of placing a cover over the food item may include covering the food item as well as the vapor generator. Steam can thus be generated by converting the fluid in the vapor generator into steam via heat from the heat source.

The present disclosure also presents examples of a kit that includes components that may be sold or provided together, or separately. These components can be designed to operate together to generate steam on a barbeque grill that has a heat source and a plurality of spaced-apart bars over the heat source. The grill kit includes a grill steamer, which can be any of the grill accessories shown and described herein. For example, the grill steamer may have a cover with an inlet port, a bottom opening, and a steaming region below the cover, the cover comprising an inlet port, and a vapor generator associated with the cover. The vapor generator may be connected or connectable to the cover, or it may be separate from the cover. In this way, the vapor generator can be provided separately from the cover, whereby various vapor generators may be configured to perform certain specific tasks. The steamer also includes an inlet port closure that closes the inlet port to inhibit the egress of steam out of the cover. The inlet port closure moves into an open position in response to being pressed inward, and is biased to default to a closed position against the inlet port when no pressure is applied to the closure.

The kit can also include a bottle or similar fluid storage device that operates in connection with the steamer. The bottle includes a squeezable container for storing a fluid, and a spout or nozzle that controls the release of fluid from the bottle. The spout of the bottle is configured to press the inlet port closure to an open position and to introduce fluid stored within the bottle into the vapor generator. That is, the size of the spout is configured to fit through the inlet port, thereby providing an inward force against the closure, thereby causing it to deflect inward. Once inserted into the port, the spout of the bottle can inject fluid into the steaming device (e.g., into a vapor generator or a conduit) from the container. For example, upon insertion, a user may squeeze the bottle, thereby ejecting fluid from the bottle and into the steamer. Such a kit can thus be provided with different bottles, each of which may contain a different fluid. Bottles containing different fluids suitable for use in different recipes could thus be sold separately, thereby providing incentives for consumers to obtain further components to the kit.

The products, kits, and methods described herein generally relate to the formation of a steaming chamber that is used to melt a topping on a food item. However, this is but one of a variety of intended uses for the product. Indeed, the described products and methods may be used for purposes that do not involve melting toppings. For example, the described examples could be used instead to steam food items such as fruits or vegetables, or to hydrate dehydrated food products. Additionally and/or alternatively, the described examples could be used to introduce moisture and flavor to a food item, regardless of a topping. For example, the described grill accessories could be provided with a sauce or juice (e.g., lemon juice) and used to provide a hint of flavoring to a food item (e.g., fish) while that product cooks. Generally, such techniques were not available prior to the described technology, as there was not an effective way to generate a steaming chamber on a barbeque grill with spaced-apart bars. In effect, the described examples can be used in any manner or process where generating steam over a food item is desired.

The above description and accompanying drawings are intended to provide non-limiting examples of various embodiments. The vapor generator and cover may be formed from aluminum, stainless steel, cast iron, and/or other materials. While the vapor generator may be a channel-shaped receptacle as described in connection with the above embodiments, the vapor generator may alternatively be otherwise configured to temporarily retain fluid for rapid evaporation. The term "melt" is used herein to refer broadly to heating and softening of the topping such that it changes shape. The term "cheese" is used broadly to refer to natural cheese, process cheese, pasteurized process cheese food and the like. While the vapor generators as depicted may be circular or a closed curve, the vapor generator may alternatively be of a quadrilateral or other shape.

The present disclosure describes preferred embodiments and examples of a steaming chamber for use on a barbeque grill and related components. Those skilled in the art will recognize that a wide variety of modifications, alterations, and combinations can be made with respect to the above described grill accessories without departing from the scope of the invention as set forth in the claims, and that such modifications, alterations, and combinations are to be viewed as being within the ambit of the inventive concept. In addition, it should also be understood that features of one embodiment described herein may be combined with features of other embodiments described herein to provide yet other embodiments as desired. All references cited in the present disclosure are hereby incorporated by reference in their entirety.

The invention claimed is:

1. A grill accessory that creates a steaming chamber on a grill, the grill having a heat source and a rack of spaced-apart bars over the heat source, the grill accessory comprising:
   a cover configured to at least partially cover a food item, the cover having a bottom opening and an inner surface, the inner surface defining a steaming region below the cover; and
   a vapor generator configured to receive and hold fluid beneath the cover, the vapor generator having at least one vent opening and being suspended from an upper region of the cover,
   wherein the grill accessory is configured to be supported by the rack of spaced-apart bars on the grill, and wherein the vapor generator is configured to transmit heat to the fluid in the vapor generator so that the fluid converts to steam, and to release the steam through the at least one vent opening into the steaming region below the cover, and wherein the cover is configured to maintain at least a portion of the steam in the steaming region below the cover.

2. The grill accessory of claim 1, wherein the vapor generator and cover are connected so that the lifting the cover off the grill simultaneously lifts the vapor generator off the grill.

3. The grill accessory of claim 2, wherein the cover comprises an intake port that allows fluid to be introduced into the grill accessory, and wherein the vapor generator is in fluid communication with the intake port.

4. The grill accessory of claim 3, further comprising a closure for the intake port, the closure being movable between an open position that allows for the receipt of fluid and a closed position that inhibits egress of steam through the intake port.

5. The grill accessory of claim 4 wherein the closure comprises a spring-loaded member configured to deflect inward to the open position in response to pressure applied from a spout of a fluid source.

6. The grill accessory of claim 2, wherein the vapor generator is removably attachable to the cover.

7. A grill accessory that creates a steaming chamber on a grill, the grill having a heat source and a rack of spaced-apart bars over the heat source, the grill accessory comprising:
   a cover configured to at least partially cover a food item, the cover having a bottom opening and an inner surface, the inner surface defining a steaming region below the cover; and
   a vapor generator configured to receive and hold fluid beneath the cover, the vapor generator having at least one vent opening, the vapor generator comprising a conduit extending from an upper portion of the cover and is coiled at least partly around the inner surface of the cover,
   wherein the grill accessory is configured to be supported by the rack of spaced-apart bars on the grill, and wherein the vapor generator is configured to transmit heat to the fluid in the vapor generator so that the fluid converts to steam, and to release the steam through the at least one vent opening into the steaming region below the cover, and wherein the cover is configured to maintain at least a portion of the steam in the steaming region below the cover.

* * * * *